UNITED STATES PATENT OFFICE.

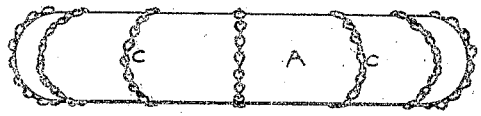
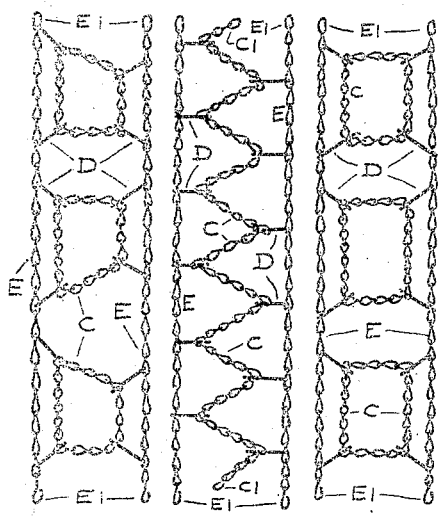
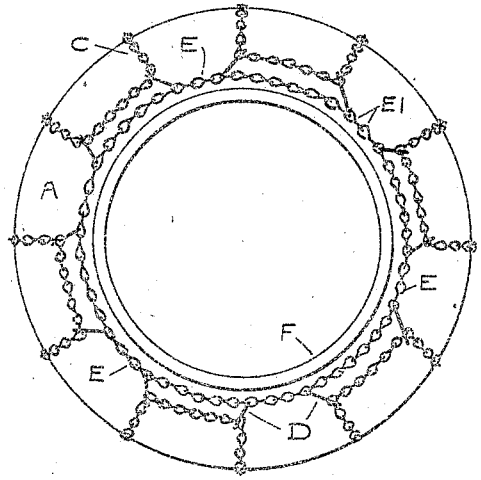
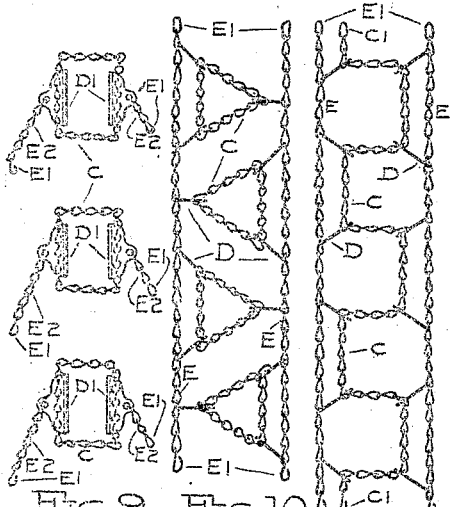
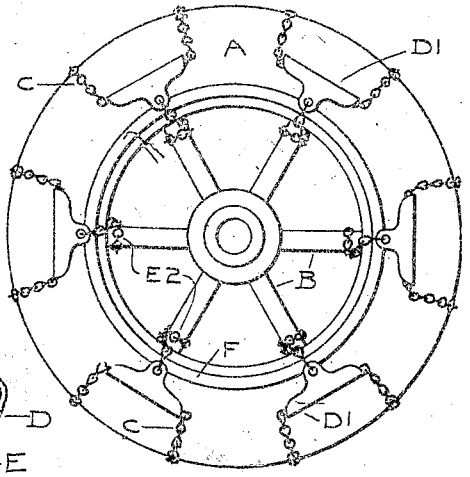
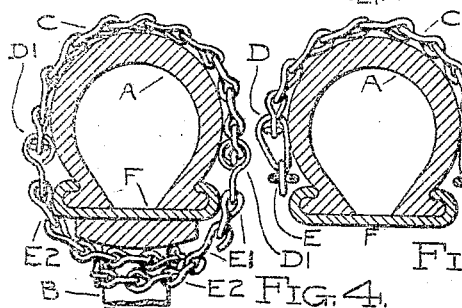

THEODORE H. CURTIS, OF LOUISVILLE, KENTUCKY.

GRIP-TREAD FOR ELASTIC TIRES.

No. 925,161.

Specification of Letters Patent.

Patented June 15, 1909.

Application filed January 2, 1908. Serial No. 409,010.

*To all whom it may concern:*

Be it known that I, THEODORE H. CURTIS, a citizen of the United States, and a resident of the city of Louisville, in the county of Jefferson and State of Kentucky, have invented certain new and useful Improvements in Grip-Treads for Elastic Tires to Prevent Slipping or Skidding on Slippery Pavements or Roads, of which the following is a full, clear, and exact description.

My invention relates to new and useful improvements in a circulating grip-tread for the tire of a vehicle wheel and especially adapted for use upon an elastic tire of either pneumatic or cushion type and comprises an endless grip-tread that can be circulated or moved transversely or obliquely or in both directions across the tread of the tire and is guided at suitable intervals by grip-tread-guides which are secured to side-holding members or side-chains which hold the grip-tread on the tread of the tire. The grip-tread can be used singularly or in multiple. In other inventions for the purpose of grip-treads and anti-slipping or anti-skidding devices, the grip-tread, which in general use has been a chain, has been held in relation to the tread of the tire, relative to transverse movement, in a stationary position, or nearly so, which produces the maximum wear on the grip-tread-chain at the portion of said chain which is over the tread of the tire. This wearing portion is confined to about two or three links of the chain, leaving about one-half to three-quarters of the chain unworn, as the entire surface of the grip-tread was not brought into position to receive equal wear; and when the wearing portion requires renewal on account of weakness and being worn out, the unworn portion must be renewed also.

The object of my invention is to provide a grip-tread that can be circulated or moved across the tread of the tire, whereby all the grip-tread may be worn equally. This I accomplish by means hereinafter described and particularly pointed out in the claims.

In the accompanying drawings, forming a part of this specification and wherein like symbols refer to like parts wherever they occur; Figure 1 is a side elevation of a vehicle elastic tire, either of cushion or pneumatic type, with grip-treads, grip-tread-guides and side-holding members applied, and Fig. 2 is a plan view of same. Fig. 3 is a side view of the elastic tire mounted on a vehicle wheel, with the grip-treads, grip-tread-guides and side-holding members applied and secured to the spokes of the wheel, and Fig. 4 is a cross section through the tire. Fig. 5 is a cross section of the elastic tire of pneumatic type, showing the grip-treads applied and secured by continuous side-holding members. Figs. 6, 7, 8, 9, 10 and 11 show the different styles of applying the grip-treads.

The vehicle elastic tire, A, either cushion or pneumatic, is mounted on the rim, F, of the vehicle wheel, and the spokes, B, support said rim. The periphery of said tire coming in contact with the ground or pavement when rolling, is known as the tread. The grip-treads, C, C, are held in position by the grip-tread-guides, D or $D^1$, using the form of guide that is suitable to the style of the grip-tread used. The grip-tread-guides are secured to side-holding members, E, E or $E^2$, $E^2$, as either form of side-holding member may be used. The side-holding members may be of any suitable material, such as chain, cable, etc. One form of side-holding member is continuous and ends $E^1$, $E^1$ are joined. Another form of side-holding member is secured to spoke, B, of the wheel, and ends $E^2$, $E^1$ are joined.

The grip-tread-guides, D, are secured to side-holding members and form guides for the circulating or movable grip-tread, the grip-tread being free and movable through the grip-tread-guides. Another form of grip-tread-guide is shown at $D^1$ and the guide is a spreader to keep the grip-tread in alinement.

The grip-tread, C, C, is continuous or endless, and preferably made of twisted link chain, but other kinds of flexible treads may be used. The grip-tread is guided by the grip-tread-guides, and these guides are so constructed that they do not bind or fetter the free movement of the grip-tread through said guides.

In Fig. 6, the grip-treads are shown in the form of a trapezoid, and each corner of the trapezoid is held by a grip-tread-guide. In Fig. 10, the grip-treads are shown in the form of a triangle. In Fig. 7, the grip-tread is shown in a zigzag form, and the grip-tread is continuous around the tire, and ends $C^1$, $C^1$ are joined. Also in Fig. 11, the grip-tread is continuous around the tire, and ends $C^1$, $C^1$ are joined. Figs. 8 and 9 show the grip-tread applied in the form of a rectangle.

To provide equal wear on all parts of the continuous grip-tread, the grip-tread must be periodically circulated across the tread of the tire. As the portion of the grip-tread over the tread of the tire becomes worn, the continuous grip-tread can be easily circulated by hand to bring an unworn portion of the grip-tread over the tread of the tire. This circulating process can be continued until the entire grip-tread is worn equally.

The method of holding the movable or circulating grip-tread across the tread of the tire may be varied in many ways, likewise the form of the grip-tread-guides and the securing of same to the side-holding members, also the form and securing of the side-holding members. Therefore, it is evident that many methods can be used and applicant claims broadly the use of a grip-tread circulating or movable across the tread of the tire and the substantial holdings for same.

One application of this invention is shown in Figs. 1, 5 and 8. The side-holding members are parallel and are open or unhooked at the ends E¹, E¹, and the grip-treads and guides and side-holding members are placed circumferentially around the tread of the tire, with a side-holding member on each side of the tire, and the said ends E¹, E¹ are closed or hooked together, thereby securely holding the side-holding members at each side of the tire, and the connecting grip-tread-guides properly guide the grip-treads in their proper position across the tread of the tire. As the circumferential length of each side-holding member is less than the circumferential length of the tire tread, it prevents either side-holding member from mounting or crossing the tread of the tire.

Another form of application of this invention is shown in Figs. 3, 4 and 9, wherein the side-holding members are secured to the spokes of the wheel.

In the preferred construction, as represented in Figs. 1, 2, 5 and 8 or in Figs. 3, 4 and 9, or in Fig. 10, a plurality or series of comparatively short endless circulating grip treads C are employed, each adapted to pass or circulate through its grip tread guides. Each of the endless circulating grip treads C may pass through any desired number of guides and of course, have a corresponding number of straight sides. Ordinarily, I prefer that each endless grip tread C should be a polygonal figure of at least four sides, as represented in Figs. 1, 3, 6, 8 and 9, although it may be a polygonal figure of but three sides, as represented in Fig. 10; though this gives a sharper angle and consequently causes the endless grip tread to circulate or slip somewhat less freely through its guides, as the angles of a three sided polygonal figure are necessarily more acute than those of a four sided polygonal figure. However, whether the endless grip tread C is arranged in a three sided polygonal figure or in a four or more sided polygonal figure, at least two of its sides will extend transversely across the tread of the tire, and I ordinarily prefer that one of these transversely extending sides should be oblique or extend both transversely and obliquely, as the obliquely extending member or side will cause the endless grip tread to automatically circulate through its guides. In cases where the series of endless grip treads C are arranged in four sided polygonal figures, and the four sides thereof are rectangularly arranged, each grip tread will nevertheless automatically circulate or creep to a greater or less extent owing to the unequal resistance the different portions of the endless loop encounter from the ground from time to time; and in this form and in every form, each endless grip tread may be readily circulated or slipped through its guides by hand from time to time as required to produce an even wear upon the different portions of the grip tread chain.

In the modification illustrated in Figs. 7 and 11, instead of providing a series or large number of endless circulating grip treads C on each tire, a single endless circulating grip tread is employed, each having a large number of transversely extending sides or lines; in Fig. 7 all the sides or lines extending both transversely and obliquely from the grip tread guide on one side to that on the other; in the form illustrated in Fig. 11, the transversely extending lines or members of the endless circulating grip tread after passing from the grip tread guide on one side to that on the other, have a longitudinal line or member extending to the next grip tread guide on the same side so that this form of single endless circulating grip tread has a plurality of transversely extending lines and a plurality of circumferentially extending lines.

What I claim as my invention and desire to secure by Letters Patent, is,

1. A circulating grip-tread for an elastic tire in combination with grip-tread-guides and side-holding members, said grip tread circulating across the tire from side to side substantially as described.

2. A circulating grip-tread for an elastic tire, said grip-tread being used in multiple and guided by grip-tread-guides attached to side-holding members through which guides said grip tread circulates across the tire from side to side.

3. A circulating grip-tread for an elastic tire and guide means through which the grip tread circulates for holding said grip-tread in proper position across the tread of the tire, substantially as described.

4. A circulating grip-tread for an elastic tire, said grip-tread being secured to side-holding members by grip-tread-guides, and said guides being secured in proper position on the side-holding members to guide the grip-tread in the form of a four sided polygon.

5. A circulating grip-tread for an elastic tire, said grip-tread being secured to side-holding members by grip-tread-guides, and said guides being secured in proper position on the side-holding members to guide the grip-tread in the form of a polygon.

6. A circulating grip-tread for an elastic tire, said grip-tread being secured to side-holding members by grip-tread-guides, and said guides being secured in proper position on the side-holding members to guide the grip-tread in the form of a four sided polygon having one of its sides extending both transversely and obliquely of the tire tread.

7. The combination with a circulating grip tread for an elastic tire, of side holding members and grip tread guides through which the grip tread circulates, secured to said holding members in position to guide the grip tread in a plurality of lines extending at angles to each other, substantially as specified.

8. The combination with a circulating grip tread for an elastic tire, of side holding members and grip tread guides through which the grip tread circulates, secured to said holding members in position to guide the grip tread in a plurality of lines extending at angles to each other, one or more of said lines extending transversely across the tread of the tire, substantially as specified.

9. The combination with a circulating grip tread for an elastic tire, of side holding members and grip tread guides through which the grip tread circulates, secured to said holding members in position to guide the grip tread in a plurality of lines extending at angles to each other, one or more of said lines extending transversely and obliquely across the tread of the tire, substantially as specified.

10. The combination with an elastic tire, of a plurality of endless circulating polygonal shaped grip-treads, and a plurality of guides for each of said endless grip-treads, substantially as specified.

11. The combination with an elastic tire, of a plurality of endless circulating polygonal shaped grip-treads, a plurality of guides for each of said endless grip-treads, and side holding members for the grip-tread guides, substantially as specified.

12. The combination with an elastic tire, of a plurality of endless circulating polygonal shaped grip-treads, and a plurality of guides for each of said endless grip-treads, each of said endless grip-treads having a plurality of transversely extending lines or members, substantially as specified.

13. The combination with an elastic tire, of a plurality of endless circulating polygonal shaped grip-treads, and a plurality of guides for each of said endless grip-treads, each of said endless grip-treads having an obliquely and transversely extending line or member, substantially as specified.

14. The combination with an elastic tire, of a plurality of endless circulating polygonal shaped grip-treads and a plurality of guides for each of said endless grip-treads, each of said endless polygonal grip-treads having a circumferentially extending line or member, substantially as specified.

THEODORE H. CURTIS.

Witnesses:
  EDWIN S. HEDGCOCK,
  W. A. McCLURE.